United States Patent [19]

Kubo

[11] 3,840,895

[45] Oct. 8, 1974

[54] HEAD DRUM ASSEMBLY WITH GROOVES PERPENDICULAR TO AXIS OF ROTATION

[75] Inventor: Masao Kubo, Kanagawa-ken, Japan

[73] Assignee: Sony Corporation, Tokyo, Japan

[22] Filed: Apr. 17, 1973

[21] Appl. No.: 351,822

[30] Foreign Application Priority Data

Apr. 20, 1972 Japan .............................. 46-739[U]

[52] U.S. Cl. .................... 360/84, 360/102, 360/107, 360/130

[51] Int. Cl. ...... G11b 5/52, G11b 5/60, G11b 21/02

[58] Field of Search ............ 179/100.2 T, 100.2 P, 179/100.2 C; 340/174.1 E, 174.1 F; 360/84, 360/102, 107, 130

[56] References Cited

UNITED STATES PATENTS

| | | | |
|---|---|---|---|
| 3,293,377 | 12/1966 | Backers et al. | 179/100.2 T |
| 3,333,753 | 8/1967 | Streets | 179/100.2 T |
| 3,614,338 | 10/1971 | Bogels | 179/100.2 T |
| 3,643,037 | 2/1971 | Norwood | 179/100.2 P |
| 3,700,798 | 10/1972 | Sluys et al. | 179/100.2 T |

*Primary Examiner*—Alfred H. Eddleman
*Attorney, Agent, or Firm*—Lewis H. Eslinger, Esq.; Alvin Sinderbrand, Esq.

[57] ABSTRACT

In an apparatus for recording and/or reproducing signals on a magnetic tape by means of at least one rotary head which extends into an annular gap between coaxial drum members for scanning oblique tracks on the tape while the latter is guided helically about the peripheral surfaces of the drum members, at least one of the drum members is rotated at a sufficient speed to produce an air bearing or cushion between the tape and the peripheral surface of each rotated drum member, and the peripheral surface of each rotated drum member is formed with one or more circumferential, endless grooves, each of which extends in a respective plane perpendicular to the axis of rotation and avoids the breakdown of the air bearing or cushion, for example, by reason of a crease, fold or other imperfection in the tape.

10 Claims, 2 Drawing Figures

HEAD DRUM ASSEMBLY WITH GROOVES PERPENDICULAR TO AXIS OF ROTATION

BACKGROUND OF THE INVENTION

1. Field of the Invention

This invention relates generally to tape recording and/or reproducing apparatus, and more particularly is directed to improvements in such apparatus of the type in which one or more rotary recording and/or reproducing heads are provided for tracing or scanning oblique tracks on the tape as the latter is guided helically about a drum assembly having its periphery substantially coinciding with the circular path of travel of the rotary head or heads.

2. Description of the Prior Art

In tape recording and/or reproducing apparatus of the type described above, the guide drum assembly is frequently stationary with the result that there is substantial frictional resistance to the movement of the tape thereabout leading to high frequency vibration of the tape. Such high frequency vibration of the tape causes so-called jitter to appear in the television picture that may be reproduced from a video signal recorded on the tape, with the result that the quality of the reproduced picture is deteriorated.

In order to reduce the frictional resistance to movement of the tape about the guide drum, it has been proposed, for example, in U.S. Pat. No. 3,333,753 issued Aug. 1, 1967 to J. H. Streets, to effect high speed rotation of the guide drum assembly, as at least of a drum member thereof, so that air is drawn, in the direction of movement of the drum surface, in between the tape and drum surface to form an air cushion or bearing by which the tape is spaced from the surface of the drum assembly. However, in accordance with this existing proposal, the rotated guide drum member is provided with a smooth, cylindrical surface at its periphery. With a rotated drum member being a smooth peripheral surface, as aforesaid, if there is a fold, crease or other imperfection in the tape causing the latter to contact the drum surface, the air cushion or bearing is interrupted and, in the region where the movement of the drum surface is away from the location of such contact of the tape therewith, a low pressure or vacuum is produced therebetween, with the result that the ambient pressure and the inwardly acting vectors of the tape tension combine to cause excessive friction between the tape and rotated drum member. Such excessive friction causes violent grabbing or seizing of the tape on the drum surface so that the tape is severed and/or wound on the rotated drum member.

In U.S. Pat. No. 3,534,893 issued Oct. 20, 1970 to D. D. Maxson, and in U.S. Pat. No. 3,614,338 issued Oct. 19, 1971 to P. W. Bogels, it has been proposed to avoid the above problem by providing the peripheral surface of the rotated guide drum member with a series of circumferentially spaced apart grooves which extend either parallel to the axis of rotation or obliquely with respect to the latter. By virtue of such grooves, when the air bearing or cushion is interrupted by a fold, crease or other imperfection in the tape, air is supplied through the grooves to the region at which a low pressure or vacuum would otherwise be produced with the result that the seizing or grabbing of the tape on the rotated drum surface is avoided. However, the grooves extending either parallel or obliquely to the axis of rotation of the drum give rise to a high frequency vibration or oscillation of the tape which again results in the previously mentioned jitter in a picture reproduced from video signals recorded on the tape. In this case, the high frequency vibration or oscillation of the tape results either from intermittent engagement of the rotated drum surface between the grooves with the tape at the run-on and/or run-off locations, or from the intermittent or pulsing action with which air is drawn in between the tape and the drum surface by reason of the circumferentially spaced grooves in the latter.

SUMMARY OF THE INVENTION

Accordingly, it is an object of this invention to provide a tape recording and/or reproducing apparatus with an improved drum assembly for guiding the tape in respect of a rotated head or heads, and by which the frictional resistance to movement of the tape is substantially reduced while avoiding the above described disadvantages of the previous attempts to achieve that result.

Another object is to provide a drum assembly, as aforesaid, in which at least one drum member of the drum assembly is rotated to generate an air bearing or cushion between the drum surface and the tape for reducing the frictional resistance to tape movement, and in which seizing or grabbing of the tape on the drum surface is prevented in the event that the air bearing or cushion is interrupted.

A further object is to provide a drum assembly, as aforesaid, in which seizing or grabbing of the tape on the rotated drum surface is avoided without imparting a high frequency vibration to the tape that can result in jitter in a picture reproduced from a video signal recorded on the tape.

In accordance with an aspect of this invention, each drum member of the assembly which is rotated to produce the air cushion or bearing has its peripheral surface formed with one or more circumferential, endless grooves, each of which extends in a respective plane perpendicular to the axis of rotation.

The above, and other objects, features and disadvantages of the invention, will be apparent in the following detailed descrtiption of an illustrative embodiment which is to be read in connection with the accompanying drawing.

DESCRIPTION OF THE PREFERRED EMBODIMENT

Figures 1, 2:
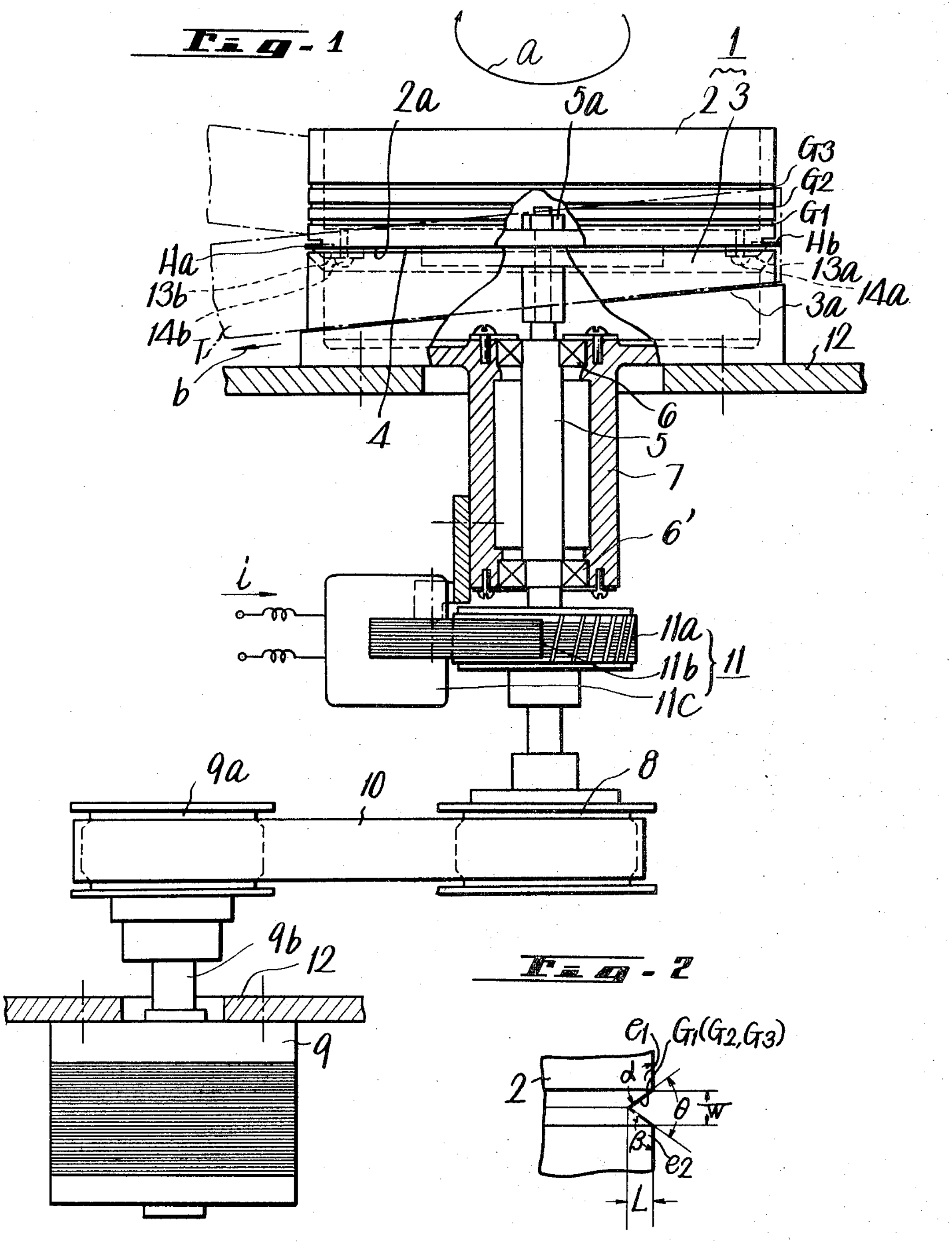
FIG. 1 is a side elevational view, partly broken away and in section, of a head-drum assembly for a tape recording and/or reproducing apparatus according to an embodiment of this invention.
FIG. 2 is an enlarged, fragmentary detail view illustrating the cross-sectional shape of each of the grooves provided in the head-drum assembly of FIG. 1.

Referring to the drawing in detail, and initially to FIG. 1 thereof, it will be seen that a head-drum assembly 1 for a magnetic tape recording and/or reproducing apparatus according to this invention generally comprises two coaxial drum members 2 and 3, for example, of aluminum alloy, which are of substantially the same diameter and axially spaced apart to define a gap 4 therebetween, and magnetic heads $H_a$ and $H_b$ extending into the gap 4 and being mounted for movement in a circular path that substantially coincides with the peripheral surfaces of drum members 2 and 3.

In the illustrated embodiment of the invention, the upper drum member 2 is rotatable and, for this purpose, is secured, as by a nut 5*a*, on the upper end of a vertical shaft 5 which is journalled in bearings 6 and 6' respectively mounted in the bottom of lower drum member 3 and in a depending tubular extension 7 thereof. A pulley 8 is secured on the lower end of rotatable shaft 5 and is driven, as by an endless flexible belt 10 of rubber or the like, from a drive pulley 9*a* secured on the shaft 9*b* of a motor 9. The motor 9 may be of a conventional synchronous type which is selected, along with the respective diameters of pulleys 8 and 9*a*, so as to drive shaft 5 at a rotational speed that is slightly higher than a predetermined reference speed so long as no braking force is applied to shaft 5. In the case where the head-drum assembly 1 is embodied in an apparatus for recording and/or reproducing television signals in accordance with the standards adopted in the United States and Japan, such reference speed may be 30 r.p.s.

A conventional braking device 11 is shown associated with shaft 5 and may include a rotor 11*a* similar to that of an induction motor and which is secured to shaft 5 between the lower end of extension 7 and pulley 8, a stator core 11*b* suspended from extension 7 so as to be in adjacent, spaced relation to rotor 11*a*, and an exciting coil 11*c* wound on core 11*b*. When a current *i* is supplied to coil 11*c*, an eddy current flows in the rotor 11*a* with the result that a braking force opposing the rotation of shaft 5 is applied thereto.

In the illustrated embodiment, the lower drum member 3 is made stationary, for example, by being suitably secured to an underlying base plate 12 of the apparatus, and the magnetic heads H*a* and H*b* are mounted on the rotatable upper drum member 2 for rotation with the latter and with an angular spacing of approximately 180° between the two heads. To this end, the magnetic heads H*a* and H*b* are fixedly attached to head supports 13*a* and 13*b*, respectively, which are, in turn secured by screws 14*a* and 14*b*, respectively, to the bottom surface 2*a* of drum member 2. Preferably, such screws extend, with clearance, through the respective holds provided in head supports 13*a* and 13*b* to permit suitable adjustment of the angular spacing between heads H*a* and H*b* and of the distances that such heads project through gap 4 beyond the adjacent peripheral surfaces of drum members 2 and 3.

The magnetic tape T shown in broken lines on FIG. 1 is wound helically about drum members 2 and 3 so that rotated magnetic heads H*a* and H*b* will alternately trace or scan tracks extending obliquely on tape T for recording and/or reproducing signals in such tracks. As shown, lower drum member 3 may be formed with a radially enlarged lower portion having a sloping top edge or shoulder which defines a helically shaped tape guide 3*a* engageable by the lower edge of tape T for helically guiding the tape about drum members 2 and 3. In the illustrated embodiment, by way of example, upper drum member 2 is rotated in the direction of the arrow *a*, that is, in the clockwise direction as viewed from above, while the tape T is transported in the direction of the arrow *b*, for example, by the usual cooperating capstan and pinch roller (not shown), so that the tape runs onto the drum assembly at the upper drum member 2 and moves about the latter, in the same direction as the rotation of upper drum member 2, onto the fixed lower drum member 3 prior to runoff from the drum assembly.

In the case where the head-drum assembly 1 is embodied in an apparatus for recording and/or reproducing television signals in accordance with the standards adopted in the United States and Japan, as mentioned above, each of the magnetic heads H*a* and H*b* preferably records or reproduces, in the respective oblique tracks on tape T, the video signal corresponding to a respective field of the television picture. In order to achieve the foregoing, the current *i* supplied to coil 11*c* of braking device 11, and hence the braking force applied to shaft 5, is varied so as to coordinate the rotational positions of heads H*a* and H*b* with the occurrence of synchronizing or other reference signals which indicate the commencement of the video signals corresponding to respective picture fields. In a conventional arrangement for effecting the foregoing coordination, index signals may be produced by a generator (not shown) which is driven by shaft 5 so as to indicate the rotational positions of heads H*a* and H*b* and such index signals are suitably compared, in phase, with the synchronizing or reference signals to provide an error signal which, in turn, is employed to control the amplitude of the current *i*.

In any case, it will be understood that the braking force applied by device 11 is sufficient to slow the rotational speed of shaft 5 down to the reference speed of, for example, 30 r.p.s. with suitable minute variations occurring in the rotational speed of shaft 5 to obtain the desired synchronization of the rotational positions of the magnetic heads in respect of the synchronizing or reference signals.

As is well known, when drum member 2 is thus rotated to move its peripheral surface at a relatively high speed in respect of the tape T, air is drawn in between the tape and drum surface to form a thin air cushion or bearing by which the frictional resistance to movement of tape T about the guide drum is substantially reduced. However, if the tape T has a fold, crease or other imperfection therein by which the air cushion or bearing is interrupted, a low pressure or vacuum is produced between the tape and drum surface in the region where the movement of the drum surface is away from the location at which the air cushion or bearing is interrupted, as by contact of the tape fold or crease with the drum surface. As a result of such low pressure or vacuum, the ambient pressure and the inwardly acting vectors of the tension on tape T can combine to cause excessive friction between the tape and the rotated drum member with the result that the tape grabs or seizes the surface of the rotated drum member and is severed and/or wound on the drum surface.

In accordance with the present invention, such seizing or grabbing of the tape on the surface of rotated drum member 2 in response to interruption of the air cushion or bearing is avoided by forming the peripheral surface of each rotated drum member with one or more circumferential, endless grooves, each of which extends in a respective plane perpendicular to the axis of rotation. More specifically, it will be seen that, in the illustrated embodiment of this invention, the peripheral surface of rotated drum member 2 is formed with three axially spaced apart, endless circumferential grooves $G_1$, $G_2$ and $G_3$ which extend in respective planes perpendicular to the axis of rotation of drum member 2.

Since grooves $G_1$–$G_3$ extend in planes perpendicular to the axis of rotation and the tape T is guided helically about drum members 2 and 3, it will be apparent that portions of the grooves $G_1$–$G_3$ are always exposed to the atmosphere, that is, left uncovered by the tape. Thus, when the air cushion or bearing is interrupted, for example, by the contact of a fold or crease in the tape with the peripheral surface of rotated drum member 2, air at atmospheric pressure can be supplied through grooves $G_1$–$G_3$ to the region in advance of the location of such contact, considered in the direction of rotation of drum member 2, to prevent the production of a vacuum or low pressure in such region and thereby to avoid the grabbing or seizing of the tape on the peripheral surface of rotated drum member 2. However, since grooves $G_1$–$G_3$ extend circumferentially about drum member 2 in respective planes perpendicular to the axis of rotation, such grooves do not give rise to a high frequency vibration or oscillation of the tape T either by intermittent engagement of the rotated drum surface between the grooves with the tape at the run-on and/or run-off locations, or by reason of an intermittent or pulsing action in the drawing-in of air between the tape and drum surface for formation of the desired air cushion or bearing.

As shown particularly on FIG. 2, each of grooves $G_1$–$G_3$ is preferably of V-shaped cross-section having its maximum width W at the opening of the respective group, that is, at the peripheral surface of drum member 2. In forming the drum member 2 with such grooves $G_1$–$G_3$ in its peripheral surface, the following manufacturing procedure has been found to be desirable:

A blank for the drum member 2 is die-cast of aluminum with an outer diameter substantially larger than the final desired diameter of drum member 2;

After the die-cast blank is annealed, the peripheral surface of the annealed blank is turned, for example, on a lathe, to have a diameter slightly larger than the final desired diameter;

After rinsing of the turned blank, the grooves $G_1$–$G_3$ of V-shaped cross-section are formed in the outer periphery thereof by a cutting tool to the desired depth in respect of the desired final diameter of drum member 2; and The peripheral surface is subjected to a further turning or fine cutting operation, as on a lathe, so as to obtain the desired final diameter of drum member 2, during which fine turning or cutting operation the burrs produced along the edges of the grooves during the cutting of the latter are removed.

If desired, the peripheral surfaces of drum members 2 and 3 may be given a final finish by running a lapping tape thereabout after the assembling of such drum members as shown on FIG. 1. When the grooves $G_1$–$G_3$ are formed by a cutting tool, as described above, it is easy to provide such grooves with the preferred V-shaped cross-section.

It has been found that the open angle $\theta$ that is, the angle enclosed between the opposite side surfaces of each V-shaped groove, is preferably in the range between 60° and 90°. If the maximum width W of the groove is unchanged, it has been found that increasing the angle $\theta$ serves to increase the effectiveness with which the desired air cushion or bearing is formed between tape T and the peripheral surface of the rotated drum member. Further, it has been found that angles $\alpha$ and $\beta$ enclosed between the side surfaces of each of the grooves and the adjacent peripheral surface portions $e_1$ and $e_2$, respectively, of drum member 2 should be greater than 90°, that is, should be obtuse angles, so as to minimize the possibility of damage to the tape at the edges of each groove and the possibility of the deflection of the tape into the groove. Thus, it is generally desirable to increase the open angle $\theta$ of each groove. However, if such angle $\theta$ is greater than 90°, the depth L of the groove relative to its width W is reduced. Since it is undesirable to excessively increase the width W of each groove, as hereinafter shown, and since it is necessary that the depth L of each groove be sufficient to avoid the clogging thereof by coating material removed from tape T, it is preferred that the angle $\theta$ be no greater than 90°.

It has been further found that the width W of each of the grooves and the number of such grooves provided in the peripheral surface of the rotated drum member affect the frictional resistance to the traveling of the tape about the drum assembly and the effectiveness of the grooves in preventing the seizing or grabbing of the tape when the air cushion or bearing is interrupted. Generally speaking, a relatively small number of relatively wide grooves is less preferred than a larger number of relatively narrower grooves. However, if the grooves are too narrow, it is possible that such grooves will be clogged by coating material removed from the tape and thus not perform the intended function of preventing seizing or grabbing of the tape on the rotated drum surface. On the other hand, if the grooves are too wide, the tape may be bent or deflected into the grooves with resultant deterioration of the smooth traveling of the tape about the drum assembly. A number of experiments have been carried out to establish the relationship between the width and number of the grooves and the effectiveness of the drum assembly in achieving the reliable reduction of frictional resistance to the movement of the tape thereabout and the avoidance of grabbing or seizing of the tape on the rotated drum member.

Generally speaking, these experiments have shown that, as the number of grooves is increased, the stability of tape travel, that is, the avoidance of seizing or grabbing of the tape on the drum surface is increased. Such stability of tape travel is approximately equal to $(1+(1/1+x))$ in which $x$ is the number of grooves. From the foregoing it appears that the number $x$ should be large. However, as indicated below, increasing the number $x$ of the grooves tends to decrease the thickness of the air cushion or bearing produced between the tape and the rotated drum surface, so that an excessive number of grooves undesirably increases the frictional resistance to tape travel. As a result of the foregoing, it has been determined that it is preferred to provide at least three grooves in the rotated drum surface.

In order to determine the effect of the width and number of grooves on the frictional resistance to transport of the tape about the drum assembly of FIG. 1, such drum assembly was operated by motor 9 without a tape T extending thereabout and with no brake current $i$ being supplied to braking device 11 in order to establish the rotational speed $a$ of the drum member 2 without any frictional drag. Then, the drum assembly was operated under the same conditions, but with the tape T being transported thereabout at the normal speed and with the maximum tension in the tape, and the resulting reduced rotational speed *b* of drum member 2 was measured as an indication of the frictional resistance between the tape and the surface of drum member 2. As a result of the measurements of the speeds *a* and *b*, a speed reduction ratio A was calculated, as follows:

$$A = (a-b/a) \times 100$$

It will be apparent that the value of A is dependent on the frictional force between the tape and the rotated drum member. The foregoing measurements were repeated with the drum member 2 having different numbers of grooves of varying widths as indicated in the table below:

| Width of Grooves (mm.) | Number of Grooves | A (%) |
|---|---|---|
| 0.1 | 3 | 0.10 |
| 0.1 | 5 | 0.15 |
| 0.2 | 3 | 0.13 |
| 0.2 | 4 | 0.17 |
| 0.2 | 5 | 0.27 |
| 0.3 | 3 | 0.50 |
| 0.3 | 4 | 0.80 |
| 0.4 | 3 | 1.20 |

In the tests having the results indicated above, the grooves had V-shaped cross-sections and were spaced apart equally on the peripheral surface of the rotated drum member.

Since the ratio A represents the frictional force between the tape and the drum assembly, it is apparent that it is desirable that the value of the ratio A be small. From the results in the above table it will be seen that the value of A increases with increasing width of the grooves and also with increases in the number of the grooves. Thus, from the point of view of the frictional force between the tape and drum assembly, it is desirable to employ grooves that are as narrow as possible. However, if the grooves have a very small width, for example, a width W of 0.025 mm., difficulty may be experienced in forming such grooves in the surface of the drum member, and further such narrow grooves are susceptible to clogging by coating material from the tape with resulting loss of their ability to prevent seizing or grabbing of the tape upon an interruption of the air cushion or bearing. By reason of the foregoing, it has been found that, from the practical point of view, the grooves should not have a width smaller than 0.05 mm.

When the head-drum assembly 1 has a servo system associated therewith, for example, the described braking device 11, for maintaining synchronism between the rotational positions of heads H*a* and H*b* and the synchronizing or reference signals, it is required that the value of A representing the frictional force between the tape and drum assembly be no greater than 0.7 percent for reliable operation of such servo system. However, such maximum value for A is theoretical and, in practice, it is desirable that the width of the grooves be smaller than that resulting in A = 0.7 percent in order to compensate for necessary tolerances in the fabrication of the drum and other components of the apparatus and in the assembling thereof. Further, in order to avoid damage to the tape, it is desirable that the frictional force between the tape and drum assembly be less than that corresponding to A = 0.7 percent. For the foregoing reasons, it is preferred that the width W of the grooves be no greater than 0.25 mm. Accordingly, it is preferred that the width W of the grooves be in the following range:

0.05 mm. W 0.25 mm.

In a specific illustrative example of this invention, a head-drum assembly 1 as shown in FIGS. 1 and 2 which exhibits desirable characteristics, both as to minimizing the frictional force between the tape and drum members and as to preventing grabbing or seizing of the tape on the rotated drum member 2 when the latter is rotated at 30 c.p.s. with a relative speed of 10.5 m/sec. between the tape and peripheral surface of the rotated drum member, has the following dimensions:

Diameter of drum member 2 = 110 mm.
Height of drum member 2 = 22 mm.
Width of tape T = 2.54 cm.
Number of V-shaped grooves = 3
W = 0.1 mm.
L = 0.087 mm.
$\theta = 60°$
$\alpha$ and $\beta = 120°$
Axial spacing between centers of grooves = 4 mm.

In the embodiment of the invention illustrated in FIG. 1, the drum assembly consists of only two drum members 2 and 3, and only the upper drum member 2 is rotated at high speed with the heads H*a* and H*b* being mounted thereon. However, it will be apparent that the arrangement may be reversed, that is, only the lower drum member 3 may be rotated at high speed with the heads H*a* and H*b* mounted thereon, and in that case, such lower drum member will be provided with the grooves in accordance with the invention. Further, if desired, both drum members 2 and 3 may be rotated and provided with the grooves in accordance with this invention in their respective peripheral surfaces.

Further, if desired, the direction of movement of the tape T about the head-drum assembly 1 can be reversed so as to be counter to the direction of movement of the heads H*a* and H*b* with the rotated drum member 2. The foregoing will increase the relative speed of the heads H*a* and H*b* in respect of the tape T and thereby increase of upper limit of the frequency band of signals that can be recorded and/or reproduced.

Although the illustrated embodiment has the heads H*a* and H*b* mounted on the rotated drum member 2 for rotation with the latter, such heads may be mounted for rotation independently of the rotated drum member or members. In the latter case, the rotational speed of the rotated drum member or members can be selected for maximum effectiveness in reducing the frictional force between the tape and drum assembly independently of the rotational speed of the magnetic heads. Further, although the illustrated embodiment has two heads with equal angular spacing therebetween which are moved in a common plane, it will be appreciated that one or more than two rotary heads may be employed, and that, where a plurality of heads is used, the angular spacing between the heads need not be equal. It is also to be noted that the magnetic heads can be spaced from each other in the direction along their axis of rotation, that is, the heads may project through respective gaps defined between three or more drum members, at least one of which is rotated at high speed to provide the desired air cushion or bearing for reducing the frictional force. Finally, although the circumferential grooves provided in the peripheral surface of each rotated drum member preferably have V-shaped cross-sections, such grooves may be alternatively provided with U-shaped or similar cross-sections.

In any case, head-drum assemblies in accordance with this invention are effective to reduce the frictional resistance to transport of the tape about the guide drum and to avoid seizing or grabbing of the tape on the rotated drum member or members when the air cushion or bearing is interrupted by a fold, erase or other imperfection in the tape. Further, the foregoing advantages are realized without damage to the tape and while avoiding the imparting of vibrations to the tape which are likely to cause jitter in a picture derived from a video signal reproduced from the tape.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of the invention.

What is claimed is:

1. In an apparatus for recording and/or reproducing signals on a magnetic tape by means of at least one magnetic head moved in a circular path, a guide drum assembly comprising a plurality of coaxial drum members defining a gap therebetween opening at the peripheral surfaces of said drum members and through which said head projects, said peripheral surfaces of the drum members substantially coinciding with said circular path of the head and having the tape helically guided thereabout so that said head traces oblique tracks on the tape, means for rotating at least one of said drum members so as to produce an air cushion between each rotated drum member and the tape for reducing the frictional resistance to movement of the tape about said drum assembly, and at least one circumferential, endless groove formed in the peripheral surface of each rotated drum member and extending in a respective plane which is substantially perpendicular to the axis of rotation of said rotated drum member.

2. An apparatus according to claim 1, in which the width of each said groove at said peripheral surface is in the range between approximately 0.05 mm. and 0.25 mm.

3. An apparatus according to claim 1, in which each said groove is of substantially V-shaped cross-section.

4. An apparatus according to claim 1, in which the opposite sides of each said groove and the adjacent portions of said peripheral surface of the respective drum member enclose obtuse angles.

5. An apparatus according to claim 1, in which each said rotated drum member has at least three circumferential endless grooves spaced apart axially in said peripheral surface thereof and each extending in a respective plane substantially perpendicular to said axis of rotation.

6. An apparatus according to claim 1, in which the number and widths of said grooves are selected to provide a speed reduction ratio that is smaller than 0.7 percent.

7. An apparatus according to claim 6, in which the width of each of said grooves is in the range between approximately 0.05 mm. and 0.25 mm.

8. An apparatus according to claim 6, in which each of said grooves has a substantially V-shaped cross-section.

9. An apparatus according to claim 6, in which the opposite sides of each of said grooves and the adjacent portions of said peripheral surface of the respective drum member enclose obtuse angles.

10. An apparatus according to claim 6, in which each said rotated drum member has at least three circumferential, endless grooves spaced apart axially in said peripheral surface thereof and each extending in a respective plane substantially perpendicular to said axis of rotation.

* * * * *